Patented Apr. 27, 1954

2,676,995

UNITED STATES PATENT OFFICE 2,676,995

SEPARATION OF STRAIGHT CHAIN PRIMARY ALCOHOLS FROM MIXTURES

Joseph Stewart, Cranford, and Thomas H. Hakala, Union, N. J., assignors to Standard Oil Development Company, a corporation of Delaware No Drawing. Application June 19, 1951,
Serial No. 232,453

9 Claims. (Cl. 260—643)

This invention relates to a selective separation of water-insoluble straight chain primary alcohols in the form of solid complexes with hydrotropic salts. It is particularly concerned with the separation of such straight chain alcohols from their branched isomers or from other water-insoluble organic compounds that do not form solid complexes.

Hydrotropic salts in a sense are water-soluble components that effect increased solubility of organic compounds otherwise less soluble in water. Effects and uses of these salts have been studied only recently, as pointed out in an article entitled "Hydrotropic Solubilities," Industrial and Engineering Chemistry, August 1948, pp. 1491–1493. These chemicals are defined under the term "Hydrotropes" in the Condensed Chemical Dictionary, 4th edition, page 351, as having the property of increasing aqueous solubility of various slightly soluble organic chemicals.

The present invention is based on a discovery of some peculiar effects of the hydrotropic salts with respect to their ability to form solid, water-insoluble complexes selectively with normal primary alcohols while they solubilize their branched isomers in aqueous solutions. The hydrotropic salts of interest in this connection are mostly the water-soluble type alkali metal salts of organic acids having from 4 to 12 carbon atoms, particularly the aliphatic carboxylates and the aromatic sulfonates, such as sodium butyrate, sodium xylene sulfonate, sodium p-xylene sulfonate, sodium p-cymene sulfonate, and the like. It will be understood that other hydrotropic salts having similar characteristics can be ascertained to have the desired property of forming the solid complexes selectively with the normal primary alcohols. The general characteristics required in the hydrotropic salts for the purpose of this invention are as follows:

(a) Solubility in water of at least 20 weight per cent, and preferably 35 to 50 weight per cent at 25° C.

(b) Non-volatile, i. e., relative to alcohols having up to 21 or more carbon atoms or up to temperatures of the order of 300° C.

It has been found that the hydrotropic salts, mainly the alkali metal salts of aliphatic carboxylic acids and aromatic sulfonic acids in aqueous solutions produce relatively insoluble complexes preferentially with the water-immiscible straight chain primary alcohols having about 7 or more carbon atoms per molecule. These complexes are precipitated in the aqueous solution of the alcohol and of the salt as the aqueous solution is diluted with water. The solid complexes can be isolated by filtration from the aqueous solution and the alcohol can be recovered from the complex by heating or by distillation. The phenomena regarding the formation of the complexes and their properties are illustrated by the following examples:

Example I

The addition of 17.6 parts by weight of n-dodecanol-1 to a solution of 38.9 parts by weight of Na xylene sulfonate in 43.5 parts by weight of $H_2O$ results in precipitation of a solid phase. Further addition of $H_2O$ to dilute the salt solution to 25.5 weight per cent salt on an organic free basis caused larger amounts of the water-insoluble solid to precipitate. The solid precipitate was filtered and examined for crystal structure. A comparison of the crystal structure from the precipitate with crystals formed by sodium xylene sulfonate was shown in photomicrographs to indicate that the complex included a mass of long needle-like crystals quite different from the structure normally exhibited by crystalline sodium xylene sulfonate. Addition of methanol to the precipitated complex caused dissociation of the complex and regeneration of the dodecanol.

Example II

A branched $C_{13}$ alcohol prepared by oxonation of $C_{12}$ propylene-butylene polymer was dissolved in 47.2 weight per cent aqueous Na xylene sulfonate solution. Dilution with water under ordinary temperature conditions gave no solid phase. A 50-50 mixture of the $C_{13}$ branched oxo alcohol with n-dodecanol-1, the normal primary alcohol, gave a solid complex precipitate under the same treating conditions, the precipitate being increased on dilution with water. This precipitated complex is similar to the complex formed from the normal primary alcohol in the absence of the branched isomeric alcohol.

Example III

Complex formation was obtained with n-octanol and n-heptanol, respectively, at ordinary temperatures of the order of 25° C., but not with n-hexanol, 2-ethyl hexanol, or octanol-2. No complex was obtained in aqueous solutions of a number of other oxy compounds, e. g. methyl n-amyl ketone, or organic acids. Oleic acid gave some evidence of complex formation but the complex formed redissolved on dilution with water.

Example IV

Complex formation was obtained with aqueous solution of sodium p-cymene sulfonate, Na butyrate, Na n-butyl sulfonate, Na benzoate, and K butyrate with n-dodecanol-1. No complex was obtained with Na propionate, NH$_4$ butyrate, or Ba butyrate, thus showing the need for having an alkali metal salt of an organic acid containing at least 4 carbon atoms per molecule.

*Example V*

A mixture of 50 cc. of n-dodecanol-1 and 50 cc. of C$_{13}$ branched oxo alcohol was treated with 200 cc. of 47.2 weight per cent Na xylene sulfonate in H$_2$O. The filtrate from this solution was diluted to 30 weight per cent salt in H$_2$O and the precipitated solid was separated by centrifuging. The separated solid complex was diluted with water and steam distilled to obtain a distillate of the alcohol regenerated from the complex. Infra red analysis of the regenerated alcohol and of the uncomplexed alcohol remaining in the aqueous solution (raffinate) showed a separation factor of 1.61, thus indicating that in a single stage partial precipitation of the complexed normal primary alcohol a satisfactory separation of the straight chain alcohol from the branched alcohols was accomplished.

*Example VI*

A number of extractions were carried out on distillation tower bottoms produced during the production of iso-octyl alcohol from C$_7$ olefins with the oxo process. These bottoms were analyzed to find present 48 weight per cent of C$_8$–C$_{16}$ alcohols, with small amounts of aldehydes, esters, acetals and hydrocarbons of similar boiling range. To separate the alcohols from the other organic compounds in this bottoms mixture, a liquid-liquid extraction was carried out at room temperature using the hydrotropic salt solutions of 35 to 50 weight per cent concentration in water. A substantial amount of the alcohols was preferentially solubilized in the aqueous salt solution and recovered, but it was found that owing to the presence of substantial amounts of normal primary alcohols, precipitation of the alcohol hydrotropic salt complex occurred and thereby caused certain difficulties of separation. By carrying out the extraction at more elevated temperatures of the order of at least about 40° C. precipitation of a solid phase was avoided and thus the extraction of the alcohols was enhanced.

After separating the undissolved organic (raffinate) phase of nonalcohols from the aqueous hydrotropic solution of alcohols (extract), the extract was diluted with water to precipitate out the normal primary alcohol complexes at ordinary temperatures in the range of 20° C.–35° C. The extract solution was diluted with water so as to contain less than 35 weight per cent of the hydrotropic salt to thus obtain an extract solution enriched in the extracted branched alcohols.

Heating the diluted extract containing the precipitated solid phase to temperatures above 50° C. caused the solid phase to disappear but the precipitate reappeared on cooling. The first solid complexes tend to be formed by the higher normal primary alcohols, e. g. C$_9$+. At ambient temperatures in the range of 20° C.–30° C. the C$_7$–C$_9$ normal primary alcohols become complexed and at lower temperatures some of the lower C$_5$ to C$_6$ alcohols may tend to undergo complex formation. Thus, the process may be used to effect separation of the straight chain primary alcohols having different molecular weights, because each of the precipitates formed at a different temperature level may be filtered and cooled separately for regeneration.

As already pointed out, the alcohols in the separated solid complex phase can be recovered by heating or steam distillation which causes dissociation of the complexes. While the complexes are insoluble in water and remain undissociated in water at ordinary temperatures, they become dissociated when they are treated by water-soluble alcohols, such as methanol, ethanol, isopropanol, or normal propanol. The presence of higher alcohols will not cause the dissociation, neither will the presence of other water-insoluble organic compounds such as hydrocarbons, ethers or ketones.

As indicated in the examples, the normal primary water-miscible alcohols can first be extracted from a liquid organic mixture containing carbonyl compounds and hydrocarbons by a liquid-liquid extraction using a concentrated aqueous solution of the hydrotropic salt and then be precipitated from the liquid aqueous extract on dilution with water. The contacting of the salt with the organic mixture can be effected in a slurry system by using a suspension or paste of the hydrotropic salt with insufficient water to solubilize all the solvent and thereafter be precipitated while the salt goes into solution in the extract upon dilution with water.

The solid complex of the normal primary alcohols with the hydrotropic salts can be separated from the liquid by filtration, centrifugation, gravitation, settling, or any of the conventional methods for separating solids from liquids and after being separated they may be washed with suitable wash liquids in which they are insoluble such as light liquid hydrocarbons as petroleum naphtha, ethers, or water-insoluble ketones in order to remove any adsorbed liquids which are the water-insoluble type.

The extraction and separation of the solid complex may be operated batchwise in a continuous manner as per Example V by countercurrent flow of the extraction.

The selective formation of the solid complexes and their separation may be used for separating and recovering high purity straight chain primary alcohols as when they are removed from a wide variety of mutually water insoluble organic compounds, such as organic carbonyl compounds, esters, organic acids, ethers, and hydrocarbons, as well as from the branched water-immiscible alcohols. On the other hand the principle of the invention may be used for the purification of branched immiscible alcohols or concentrations of such alcohols when the straight chain primary alcohols are present as an impurity. In each instance, the process involves extraction of the straight chain primary alcohols by the aqueous hydrotropic salt solution which is then varied in water content to selectively pricipitate a straight chain primary alcohol with part of the salt, thus forming a solid phase which can be separated from the remaining liquid phase.

What is claimed is:

1. In a process for the isolation of a water-immiscible straight chain primary alcohol, the steps which comprise dissolving the straight chain primary alcohol in an aqueous solution of a hydrotropic alkali metal salt of an organic acid having 4 to 12 carbon atoms per molecule, diluting the aqueous solution with sufficient added water to precipitate out a solid complex of the alcohol with a portion of said salt, and separating the precipitated complex from the remaining diluted aqueous solution of the salt.

2. A process for the isolation of a water-immiscible straight chain primary alcohol from other water-immiscible organic compounds, which comprises extracting the straight chain primary alcohol from an organic mixture thereof by an aqueous solution containing dissolved therein from 35 to 50 weight percent of a hydrotropic alkali metal salt of an organic acid having 4 to 12 carbon atoms per molecule, diluting the aqueous extract solution with sufficient added water to precipitate out a solid complex of the straight chain primary alcohol and of said salt, separating the precipitated complex from the remaining diluted aqueous solution of the hydrotropic salt, and heating the separated complex at elevated temperatures above 50° C. to decompose the complex.

3. A process for separating a water-immiscible straight chain primary alcohol from a mixture thereof with other water-immiscible alcohols which comprises dissolving the mixture of alcohols in an aqueous solution of a hydrotropic alkali metal salt of an organic acid having 4 to 12 carbon atoms per molecule, diluting the aqueous solution with sufficient added water to precipitate out a solid complex of the straight chain primary alcohol while maintaining the other alcohols in the aqueous solution and separating the precipitated complex from the remaining diluted aqueous solution of the salt and of the unprecipitated other alcohols.

4. A process for the isolation of a water-immiscible straight chain primary alcohol from a mixture of water-immiscible organic compounds, which comprises extracting the straight chain primary alcohol by an aqueous solution of a hydrotropic alkali metal salt of an organic acid having 4 to 12 carbon atoms per molecule, diluting the aqueous solution with sufficient added water to precipitate a solid complex of the straight chain primary alcohol and of the salt, separating the precipitated complex from the diluted aqueous solution, and distilling the alcohol of the separated complex.

5. In a process for isolating a water-immiscible straight chain primary alcohol containing at least 7 carbon atoms per molecule, the steps comprising dissolving said alcohol in an aqueous solution containing between 35 and 50 weight percent of a dissolved hydrotropic alkali metal salt of an aliphatic carboxylic acid having 4 to 12 carbon atoms per molecule, diluting the aqueous solution with sufficient added water to precipitate out a solid complex of the alcohol and of the salt, and separating a precipitated complex from the remaining diluted aqueous solution of the salt.

6. In a process as defined by claim 5, said hydrotropic salt being sodium butyrate.

7. In a process for isolating a water-immiscible straight chain primary alcohol having at least 7 carbon atoms per molecule, the steps which comprise dissolving the alcohol in an aqueous solution containing 35 to 50 weight percent of a hydrotropic alkali metal salt of an aromatic sulfonic acid having up to 12 carbon atoms per molecule, diluting the aqueous solution with sufficient added water to precipitate out a solid complex of the alcohol and of the salt, and separating the precipitated complex from the remaining diluted aqueous solution of the salt.

8. In a process as defined by claim 7, said hydrotropic salt being sodium xylene sulfonate.

9. In a process as defined by claim 7, said hydrotropic salt being sodium p-cymene sulfonate.

References Cited in the file of this patent

UNITED STATES PATENTS

| Number | Name | Date |
| --- | --- | --- |
| 2,208,808 | Fischer | July 23, 1940 |
| 2,535,069 | Johnson | Dec. 26, 1950 |
| 2,535,070 | Walker et al. | Dec. 26, 1950 |
| 2,568,517 | Sharp et al. | Sept. 18, 1951 |
| 2,569,984 | Fetterly | Oct. 2, 1951 |